United States Patent
Koh

(10) Patent No.: US 11,414,040 B2
(45) Date of Patent: Aug. 16, 2022

(54) AIR BAG CUSHION FOR VEHICLE

(71) Applicant: HYUNDAI MOBIS CO., LTD., Seoul (KR)

(72) Inventor: Min Seok Koh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/134,448

(22) Filed: Dec. 27, 2020

(65) Prior Publication Data
US 2022/0169198 A1 Jun. 2, 2022

(30) Foreign Application Priority Data
Dec. 1, 2020 (KR) .................. 10-2020-0165848

(51) Int. Cl.
B60R 21/231 (2011.01)
B60R 21/205 (2011.01)
B60R 21/203 (2006.01)

(52) U.S. Cl.
CPC .......... B60R 21/231 (2013.01); B60R 21/205 (2013.01); B60R 21/203 (2013.01)

(58) Field of Classification Search
CPC .... B60R 21/231; B60R 21/205; B60R 21/203
USPC ...................... 280/743.1, 732, 731
See application file for complete search history.

(56) References Cited

U.S. PATENT DOCUMENTS

| 5,454,594 | A | * | 10/1995 | Krickl | B60R 21/231 280/728.1 |
|---|---|---|---|---|---|
| 2007/0200319 | A1 | * | 8/2007 | Idomoto | B60R 21/2346 280/729 |
| 2009/0115177 | A1 | * | 5/2009 | Pausch | B60R 21/231 280/743.2 |
| 2010/0230940 | A1 | * | 9/2010 | Hellot | B60R 21/205 280/732 |
| 2011/0260436 | A1 | | 10/2011 | Park et al. | |

FOREIGN PATENT DOCUMENTS

| DE | 197 07 997 | 1/2001 |
|---|---|---|
| DE | 10 2011 018 784 | 10/2011 |
| KR | 10-2013-0070282 | 6/2013 |

* cited by examiner

*Primary Examiner* — Keith J Frisby
(74) *Attorney, Agent, or Firm* — H.C. Park & Associates, PLC

(57) ABSTRACT

An airbag cushion is formed by combining a front panel and a rear panel, so the structure is simple and the number of parts is small. Accordingly, it is possible to reduce the manufacturing cost, the weight, and the volume, so the airbag cushion can be easily packed and manufactured. The airbag cushion is also configured to safely protect a passenger because it can be quickly unfolded and can be supported by a vehicle body part.

20 Claims, 5 Drawing Sheets

AIR BAG CUSHION FOR VEHICLE

CROSS REFERENCE TO RELATED APPLICATION

This application claims priority from and the benefit of Korean Patent Application No. 10-2020-0165848, filed on Dec. 1, 2020, which is hereby incorporated by reference for all purposes as set forth herein.

BACKGROUND

Field

Exemplary embodiments relate to an airbag cushion for a vehicle which is composed of two panels and can freely change the unfolded shape thereof.

Discussion of the Background

In general, an airbag system for a vehicle is a system that can reduce an injury by instantaneously inflating an airbag in a vehicle collision.

Such an airbag system is mounted in the steering wheel ahead of the driver seat or at a passenger seat and prevents injury of a driver or passenger by unfolding a cushion by supplying gas from an inflator when a shock is applied to a vehicle.

In the related art, an airbag cushion is composed of one main panel and a pair of side panels coupled to both sides of the main panel. A front tether for maintaining the front-rear shape in a folded state and a lateral tether for maintaining the left-right shape in the unfolded state are disposed in the chamber inside the main panel and the side panels.

However, since the airbag system of the related art has a complicated configuration and a large volume, an accommodation space for the airbag in its unexpanded state is difficult to obtain. Further, since the corners of the assembly of the main panel and the side panels have to be filled with gas, the expansion speed is low, and so such an airbag structure is not advantageous to protect a passenger.

The foregoing is intended merely to aid in the understanding of the background of the present disclosure, and is not intended to mean that the present disclosure falls within the purview of the related art that is already known to those skilled in the art.

The above information disclosed in this Background section is only for enhancement of understanding of the background of the invention and, therefore, it may contain information that does not constitute prior art.

SUMMARY

Exemplary embodiments provide an airbag cushion for a vehicle that is formed by combining two panels (a front panel and a rear panel), so the structure is simple and the number of parts is small. Accordingly, it is possible to reduce the manufacturing cost, the weight, and the volume, so the airbag cushion can be easily packed and manufactured. Exemplary embodiments also provide an airbag cushion for a vehicle that can safely protect a passenger due to its capability of being quickly unfolded and being supportable by a vehicle body part.

Additional features of the invention will be set forth in the description which follows, and in part will be apparent from the description, or may be learned by practice of the invention.

Accordingly, an airbag cushion for a vehicle according to at least one embodiment includes: a rear panel divided into an upper panel and a lower panel, both sides of the upper panel and lower panel being connected to each other and the lower panel being open to have a recessed portion: and a front panel having an upper end connected to the upper panel and having a lower end connected to the lower panel to form a chamber together with the rear panel, the lower end being inserted in and connected to the recessed portion of the lower panel such that the upper end corresponds to a passenger and the lower end is supported by a vehicle body part when the airbag cushion expands.

The upper panel may be formed such that a width thereof gradually increases upward from a joint with the lower panel, and the lower panel may be formed such that a width thereof gradually increases downward from a joint with the upper panel.

An open groove having an increasing diameter may be formed at an end of the recessed portion of the lower panel.

A position of the open groove may be determined such that a curved portion is supported by vehicle car body part when the airbag cushion expands.

An inner end forming the recessed portion of the lower panel may be smoothly recessed, so that a curved portion protrudes.

The recessed portion may be formed upward from an end of the lower panel, and supporting portions protrude inside the recessed portion.

The supporting portions of the lower panel are formed at positions where the supporting portions may be supported by a vehicle body part when the airbag cushion expands.

A width at an end of the upper panel and a width at an end of the lower panel may be determined in accordance with an expansion shape and an expansion size of the airbag cushion.

A gas inlet may be formed at a joint of the upper panel and the lower panel of the rear panel.

In the rear panel, upper side joints and a top joint may be formed along an edge of the upper panel, and lower side joints and a bottom joint may be formed along an edge of the lower panel, so both sides of the upper panel and the lower panel may be connected by connecting the upper side joints and the lower side joints.

Recessed portion joints may be formed along edges of the recessed portion of the lower panel and front joints may be formed along edges of the upper end and the lower end of the front panel, so the front panel may be connected to the top joint, the bottom joint, and the recessed portion joints of the rear panel through the front joints.

The front panel may be formed such that the lower end protrudes downward from the recessed portion of the rear panel when expanding.

A diameter of the lower end of the front panel may be made larger than the diameter of the recessed portion such that the lower end protrudes downward when the airbag cushion expands.

The airbag cushion for a vehicle according to one embodiment is formed by combining two panels (a front panel and a rear panel), so the structure is relatively simple and the number of parts is relatively small. Accordingly, it is possible to reduce the manufacturing cost, the weight, and the volume, so the airbag cushion can be easily packed and manufactured. Further, the expansion speed of the airbag cushion increases and the airbag cushion is supportable by a vehicle body part, whereby it is possible to safely protect a passenger.

An airbag cushion for a vehicle according to another embodiment includes a first panel divided into an upper portion having first and second sides and a lower portion having first and second sides, the first and second sides of the upper portion and the first and second sides of the lower portion respectively being connected to each other and the lower portion being open to have a recessed portion. The airbag cushion further includes a second panel having an upper end connected to the upper portion of the first panel and having a lower end connected to the lower portion of the first panel to form a chamber together with the first panel. The lower end is inserted in and connected to the recessed portion of the lower portion of the first panel such that the upper end cushions a passenger and the lower end is supported by a vehicle body part when the airbag cushion expands.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

The above and other objectives, features and other advantages of the present invention will be more clearly understood from the following detailed description when taken in conjunction with the accompanying drawings, in which.

DETAILED DESCRIPTION OF THE ILLUSTRATED EMBODIMENTS

Figure 1:
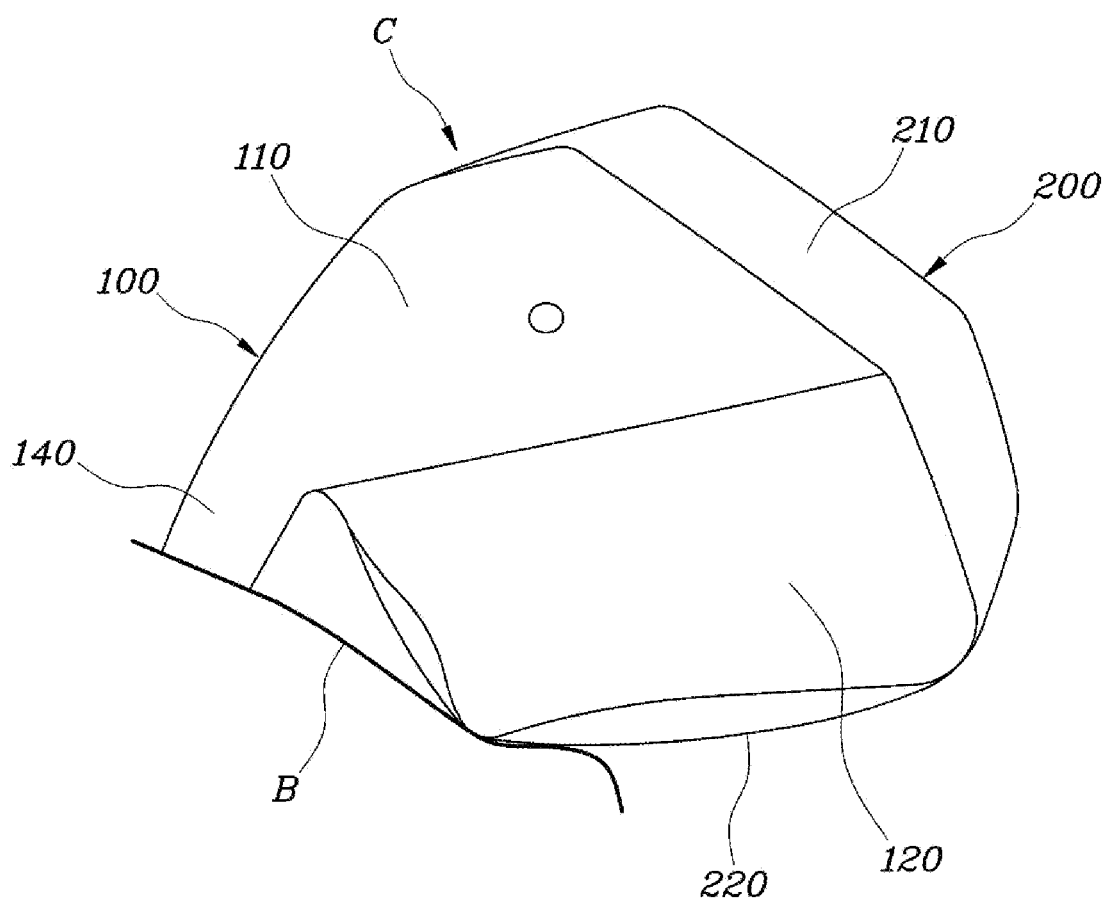
FIGS. 1 and 2 are views showing an airbag cushion for a vehicle according to an embodiment.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification have the same meaning as those that are understood by those who are skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

An airbag cushion for a vehicle according to exemplary embodiments is described hereafter with reference to the accompanying drawings.

Figure 2:
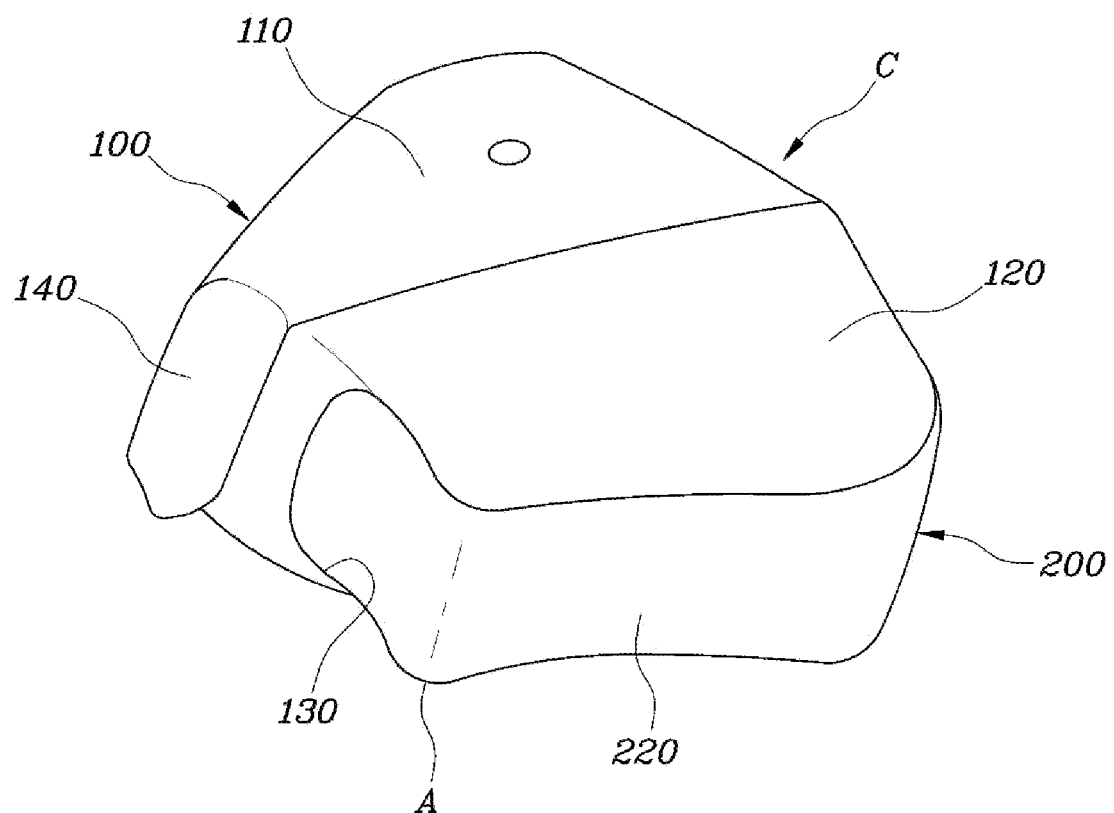
Figure 3:
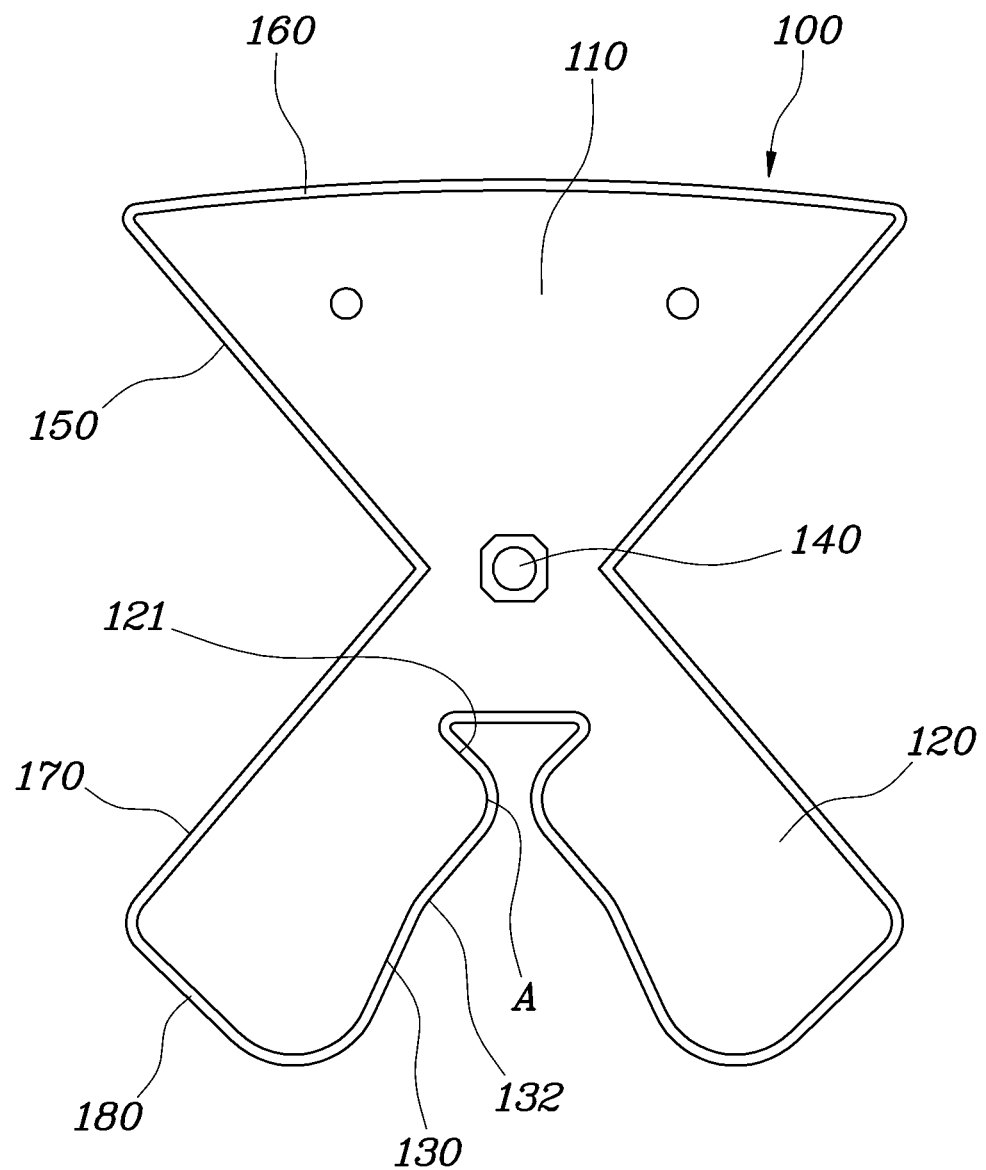
FIG. 3 is a view showing a rear panel of an airbag cushion according to an embodiment.
Figure 4:
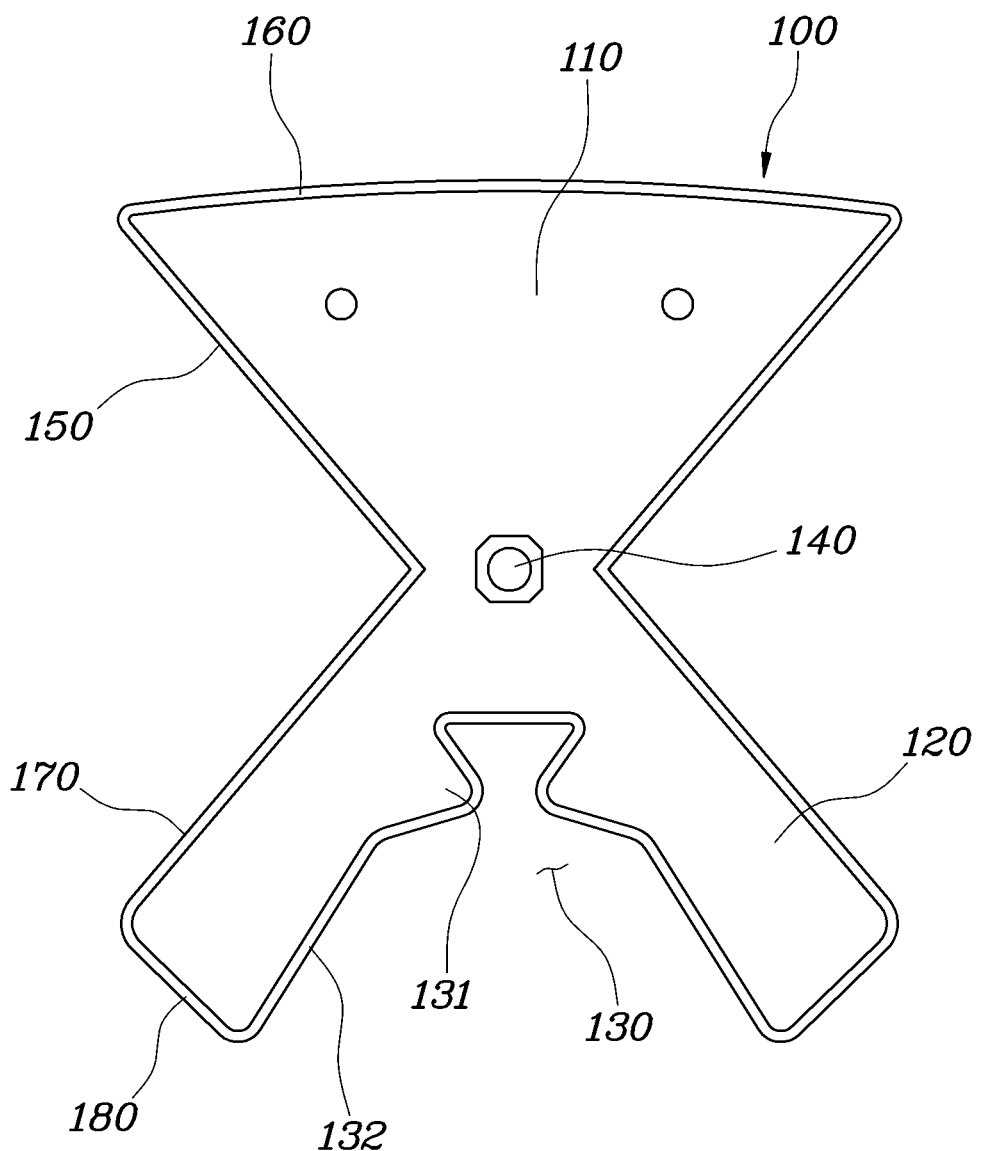
FIG. 4 is a view showing a rear panel of an airbag cushion according to another embodiment.
Figure 5:
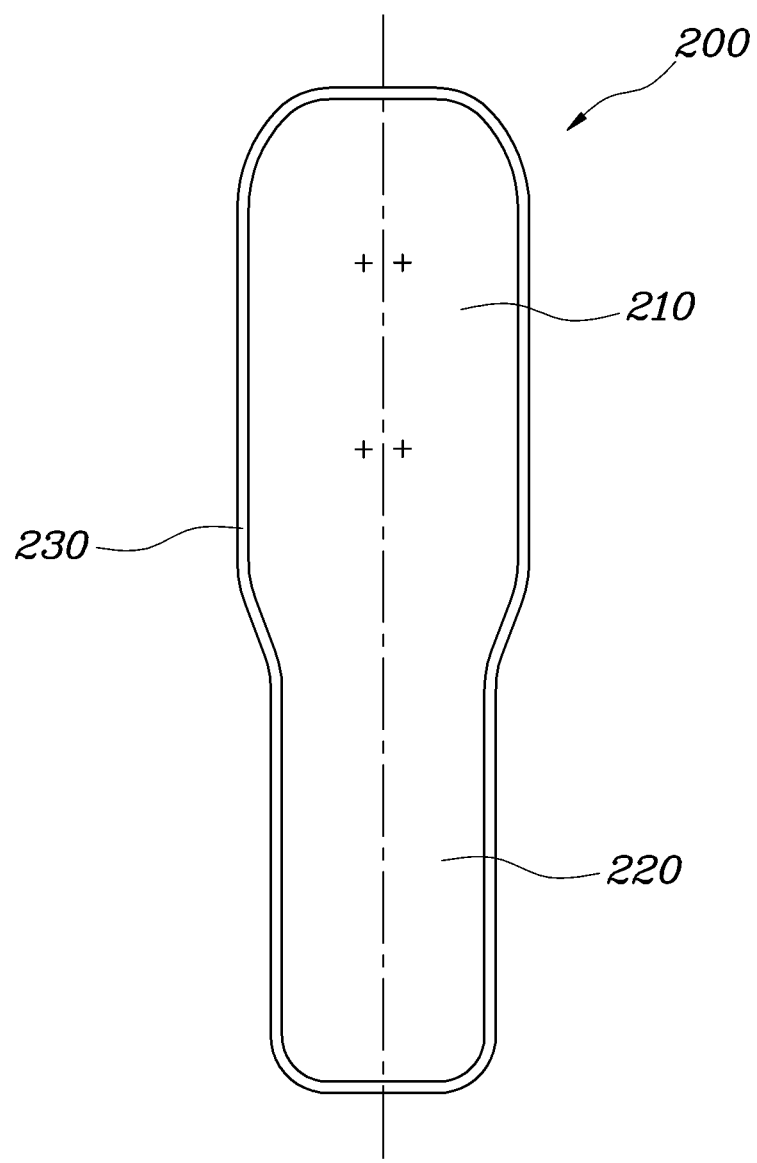
FIG. 5 is a view showing a front panel of an airbag cushion according to an embodiment.

FIGS. 1 and 2 are views showing an airbag cushion for a vehicle according to an embodiment, FIG. 3 is a view showing an embodiment of a rear panel of an airbag cushion according to an embodiment, FIG. 4 is a view showing another embodiment of a rear panel of an airbag cushion according to another embodiment, and FIG. 5 is a view showing a front panel of an airbag cushion according to an embodiment.

As shown in FIGS. 1 to 5, an airbag cushion for a vehicle includes: a rear panel 100 divided into an upper panel 110 and a lower panel 120, both sides of the upper panel 110 and lower panel 120 being connected to each other and the lower panel 120 being open to have a recessed portion 130: and a front panel 200 having an upper end 210 connected to the upper panel 110 and having a lower end 220 connected to the lower panel to form a chamber together with the rear panel 100, the lower end 220 being inserted in and connected to the recessed portion 130 of the lower panel 120 such that the upper end 210 is configured to cushion a passenger during a vehicle collision and the lower end 220 is supported by a vehicle body part B when the airbag cushion expands. In at least one embodiment, the upper panel 110 is connected to the lower panel 120 by the upper panel 110 being stitched to the lower panel 120, whereby other ways of connecting the upper panel 110 with the lower panel 120 may be envisioned while remaining within the spirit and scope of the invention. The vehicle body part B may be one of various parts including a dashboard positioned ahead of a driver seat or front passenger seat in a vehicle.

That is, the airbag cushion C is composed of the rear panel 100 and the front panel 200 and has a chamber therein, thereby protecting a passenger by expanding. According to at least one embodiment as described above, since the airbag cushion is formed by combining two panels (the rear panel 100 and the front panel 200), the structure is simple and the number of parts is small, so it is possible to reduce the manufacturing cost, the weight, and the volume. Accordingly, it is possible to easily pack and manufacture the airbag cushion.

The rear panel 100 is divided into the upper panel 110 and the lower panel 120, and the shapes of the upper panel 110 and the lower panel 120 may be determined by taking into consideration of the shape of the airbag cushion C when the airbag cushion C expands. Both ends of the upper panel 110 and the lower panel 120 are connected to each other, thereby forming therein a space that is the chamber. In particular, since the rear panel 100 has the recessed portion 130 so that the front panel 200 is inserted therein, so the front panel 200 can be connected through the recessed portion 130.

A gas inlet 140 may be formed at the joint of the upper panel 110 and the lower panel 120 of the rear panel 100. The gas inlet 140, which is a part through which gas is injected from an inflator, is formed at the joint of the upper panel 110 and the lower panel 120 so that gas can be injected into the chamber.

The front panel 200 is combined with the rear panel 100 such as by stitching the front panel 200 with the rear panel 100, whereby the space between the upper panel 110 and the lower panel 120 is sealed and the chamber is formed. That is, the front panel 200 has the upper end 210 connected to the upper panel 110 and the lower end 220 connected to the lower panel 120, thereby forming the chamber together with the rear panel 100. Accordingly, the front panel 200 faces a passenger when the airbag cushion C is unfolded.

In particular, the front panel 200 is connected to the lower panel 120 with the lower end 220 inserted in the recessed portion 130 of the lower panel 120. Accordingly, when the airbag cushion C expands, the upper end 210 of the front panel 200 faces and protects a passenger from shock due to a vehicle collision and the lower end 220 is supported by a vehicle body part B, whereby the airbag cushion C can be more strongly supported and more safely protect a passenger during a vehicle collision.

According to the airbag cushion C of at least one embodiment, the joint of the rear panel 100 and the front panel 200 can be formed in a curved shape, and the curved shape can be determined by taking into consideration the shape of the chamber when the airbag cushion C expands.

As described above, according to at least one embodiment, when the airbag cushion C expands, the front panel 200 combined with the rear panel 100 protects a passenger and is supported by the vehicle body part B, so the ability to protect a passenger during a vehicle collision by way of the airbag cushion C is improved.

In detail, the upper panel 110 is formed such that the width gradually increases upward from the joint with the lower panel 120 and the lower panel 120 is formed such that the width gradually increases downward from the joint with the upper panel 110.

As shown in FIG. 3, since the upper panel 110 is formed such that the width gradually increases upward and the lower panel 120 is formed such that the width gradually increases downward, it is possible to secure the size of the front panel 200 connected to the upper panel 110 and the lower panel 120. That is, when the widths of the upper panel 110 and the lower panel 120 are large, the size of the front panel 200 connected to the rear panel 100 is also large, so the expansion volume can be large. Accordingly, the range that protects a passenger by the front panel 200 of the airbag cushion C is secured, and as such the airbag cushion C is able to safely cushion and thus protect the passenger. Further, the upper panel 110 and the lower panel 120 gradually increase in diameter to form a triangular shape, so the rear panel 100 has a trumpet shape when both sides of the upper panel 110 and the lower panel 120 are connected. Accordingly, the airbag cushion C can be achieved by connecting the rear panel 100 and the front panel 200. The diameters of the upper panel 110 and the lower panel 120 can be determined by taking into consideration various factors such as the interior structure of the vehicle, and the arrangement of other parts of the vehicle. Further, it is possible to unfold the airbag cushion C in various shapes by adjusting the diameters of the upper panel 110 and the lower panel 120. Therefore, according to at least one embodiment, it is possible to implement the airbag cushion C in various shapes in accordance with the different kinds of vehicles the airbag cushion C is to be installed in or the installation environment of the airbag cushion C.

Meanwhile, an open groove 121 having an increasing diameter is formed at the end of the recessed portion 130 of the lower panel 120, whereby an inward curved portion A is formed.

As shown in FIG. 3, the open groove 121 is formed at the recessed end of the recessed portion 130 of the lower panel 120, so the curved portion A protruding inward is formed.

Further, since the lower panel 120 is recessed at the inside end where the recessed portion 130 is formed, the curved portion A protrudes inside the recessed portion 130.

Accordingly, the lower end 220 of the front panel 200 may be formed to correspond to the recessed portion 130 and the open groove 121 and the lower end 220 protrudes in the same shape as the shape of the curved portion A protruding inside the recessed portion 130. As described above, since the lower end 220 of the front panel 200 protrudes along the curved portion A, an area supported to the vehicle body part B is secured, so the airbag cushion C is more strongly retained within a vehicle.

The position of the open groove 121 may be determined such that the curved portion A is supported by the vehicle body part B when the airbag cushion C expands. Accordingly, when the airbag cushion C expands, the curved portion A of the rear panel 100 is supported by the vehicle body part B. Further, the front panel 200 is also supported by the vehicle body part B due to the smoothly protruding shape of the curved portion A.

As another embodiment, as shown in FIG. 4, the recessed portion 130 may be formed upward from the end of the lower panel and supporting portions 131 may protrude inside the recessed portion 130. Since the recessed portion 130 is formed upward from the end of the lower panel 120, the lower panel 120 is laterally divided and the lower end 220 of the front panel 200 is inserted in and connected to the recessed portion 130. In this case, since the supporting portions 131 protrude inside the recessed portion 130, the area on which the rear panel 100 and the front panel 200 are supported with respect to the vehicle body part B is secured, so the airbag cushion C is more strongly retained within the vehicle.

In particular, the supporting portions 131 of the lower panel 120 may be formed at positions where they are supported by the vehicle body part B when the airbag cushion expands. Accordingly, when the airbag cushion C expands, the supporting portions 131 protruding inside the recessed portion 130 of the rear panel 100 are supported by the vehicle body part B. Further, the front panel 200 is also supported by the vehicle body part B because it protrudes downward with the protruding supporting portions 131.

As described above, since the curved portion A protruding downward is formed inside the recessed portion of the lower panel 120 of the rear panel 100 by the opening groove 121 or the supporting portion 131 protrudes inside the recessed portion 130, the lower end 220 of the front panel 200 connected to the recessed portion 130 also protrudes downward in the same shape as the protruding shape of the lower panel 120. Accordingly, when the airbag cushion C expands, a passenger is protected by the upper end 210 of the front panel 200 connected to the rear panel 100. Further, since the lower end 220 of the front panel 200 protrudes downward to correspond to the shape of the curved portion A of the rear panel 100 or the protruding shape of the supporting portion 131, the airbag cushion C is supported by the vehicle body part B and more strongly retained in the vehicle.

Meanwhile, the width of the end of the upper panel 110 and the width of the end of the lower panel 120 may depend on the expansion shape and the expansion size of the chamber when the airbag cushion expands. Since the width at the end of the upper panel 110 and the width at the end of the lower panel 120 are adjusted by taking into consideration the kind of interior structure of the vehicle in which the airbag cushion C is stored, and the arrangement of other parts of the vehicle, the unfolded shape of the airbag cushion C can be variously changed to suit installation in different kinds of vehicles. Therefore, according to one or more embodiments, it is possible to implement the airbag cushion C in various shapes in accordance with the different kinds of vehicles for which the airbag cushion C is to be installed or the installation environment of the airbag cushion C.

As another embodiment, the front panel 200 may be formed such that the lower end 220 protrudes downward from the recessed portion 130 of the rear panel 100 when expanding. When the lower end 220 of the front panel 200 protrudes downward, as described above, the lower end 220 of the front panel 200 can be supported by the car body part B when the airbag cushion C expands.

To this end, the diameter of the lower end 220 of the front panel 200 is made larger than the diameter of the recessed portion 130 such that the lower end 220 can protrude downward when the airbag cushion expands. That is, a deformation amount of the front panel 200 is secured by the difference between the diameter of the lower end 220 of the front panel 200 and the diameter of the recessed portion 130. Accordingly, when the airbag cushion C expands, the lower end 220 of the front panel 200 is protruded downward by gas, so it can be strongly retained by the vehicle body part B.

Meanwhile, in the rear panel, upper side joints 150 and a top joint 160 are formed along the edge of the upper panel, and lower side joints 170 and a bottom joint 180 are formed along the edge of the lower panel. Accordingly, both sides of the upper panel and the lower panel can be connected by connecting the upper side joints 150 and the lower side joints 170.

That is, the upper side joints 150 and the top joint 160 are formed along the edge of the upper panel 110 of the rear panel 100, and the lower side joints 170 and the bottom joint 180 are formed along the edge of the lower panel 120. The rear panel 100 forms the rear shape of the airbag cushion C by connecting the upper side joints 150 at both ends of the upper panel 110 and the lower side joints 170 at both sides of the lower panel 120. Accordingly, the shapes and lengths of both sides of the upper panel 110 and the lower panel 120 are the same, so the upper side joints 150 and the lower side joints 170 can be connected well. The upper side joints 150 and the top joint 160 may be sewn to each other. Accordingly, since the rear panel 100 forms the rear shape of the airbag cushion C by sewing the upper side joints 150 and lower side joints 170 to each other, the degree of protrusion of the airbag cushion C when the airbag cushion C expands is determined.

Meanwhile, recessed portion joints 132 are formed along the edges of the recessed portion 130 of the lower panel 120 and front joints 230 are formed along the edges of the upper end 210 and the lower end 220 of the front panel 200, so the front panel is connected to the top joint 160, the bottom joint 180, and the recessed portion joints 132 of the rear panel 100 through the front joints 230.

As described above, since the front joints 230 are formed along the edges of the upper end 210 and the lower end 220 of the front panel 200, the airbag cushion C is formed by connecting the front joints 230 to the top joint 160 and the bottom joint 180 of the rear panel 100. Further, since the recessed portion joints 132 are also formed along the edges of the recessed portion 130 of the lower panel 120, the front joints 230 at the lower end 220 of the front panel 200 are connected to the recessed portion joint 132. As described above, since the front panel 200 is connected to the top joint 160, the bottom joint 180, and the recessed portion joint 132 of the rear panel 100 through the front joints 230, the shape of the airbag cushion C can be formed.

Since the airbag cushion for a vehicle which has the structure described above is formed by combining two panels (the front panel 200 and the rear panel 100), the structure is simple and the number of parts is small, so it is possible to reduce the manufacturing cost, weight, and volume. Accordingly, the airbag cushion is easy to pack and manufacture. Further, the expansion speed of the airbag cushion increases and the airbag cushion is supported by the vehicle body part B, whereby it is possible to safely protect a passenger when a vehicle collision occurs.

Although the present invention was provided above in relation to specific embodiments shown in the drawings, it is apparent to those skilled in the art that the present invention may be changed and modified in various ways without departing from the scope of the present invention, which is described in the following claims.

What is claimed is:

1. An airbag cushion for a vehicle, the airbag cushion comprising:
   a rear panel divided into an upper rear panel having first and second sides and a lower rear panel having first and second sides, the first and second sides of the upper rear panel and the first and second sides of the lower rear panel respectively being connected to each other and the lower rear panel being open to have a recessed portion: and
   a front panel having an upper end connected to the upper rear panel and having a lower end connected to the lower rear panel to form a chamber together with the rear panel, the lower end being inserted in and connected to the recessed portion of the lower rear panel such that the upper end cushions a passenger and the lower end is supported by a vehicle body part when the airbag cushion expands.

2. The airbag cushion of claim 1, wherein the upper rear panel is formed such that a width thereof gradually increases upward from a joint with the lower rear panel and the lower rear panel is formed such that a width thereof gradually increases downward from a joint with the upper rear panel.

3. The airbag cushion of claim 1, wherein an open groove having an increasing diameter is formed at an end of the recessed portion of the lower rear panel.

4. The airbag cushion of claim 3, wherein a position of the open groove is determined such that a curved portion is supported by the vehicle body part when the airbag cushion expands.

5. The airbag cushion of claim 3, wherein an inner end forming the recessed portion of the lower rear panel is smoothly recessed, such that a curved portion protrudes.

6. The airbag cushion of claim 1, wherein the recessed portion is formed upward from an end of the lower rear panel, and supporting portions protrude inside the recessed portion.

7. The airbag cushion of claim 6, wherein the supporting portions of the lower rear panel are formed at positions where the supporting portions are supported by the vehicle car body part when the airbag cushion expands.

8. The airbag cushion of claim 1, wherein a width at an end of the upper rear panel and a width at an end of the lower rear panel are determined in accordance with an expansion shape and an expansion size of the airbag cushion.

9. The airbag cushion of claim 1, wherein a gas inlet is formed at a joint of the upper rear panel and the lower rear panel.

10. The airbag cushion of claim 1, wherein in the rear panel, upper side joints and a top joint are formed along an edge of the upper rear panel, and lower side joints and a bottom joint are formed along an edge of the lower rear panel, such that the first and second sides of the upper rear panel and the lower rear panel are respectively connected to each other by connecting the upper side joints and the lower side joints.

11. The airbag cushion of claim 10, wherein recessed portion joints are formed along edges of the recessed portion of the lower rear panel and front joints are formed along edges of the upper end and the lower end of the front panel, such that the front panel is connected to the top joint, the bottom joint, and the recessed portion joints of the rear panel via the front joints.

12. The airbag cushion of claim 1, wherein the front panel is formed such that the lower end protrudes downward from the recessed portion of the rear panel when the airbag cushion expands.

13. The airbag cushion of claim 12, wherein a diameter of the lower end of the front panel is made larger than a diameter of the recessed portion such that the lower end protrudes downward when the airbag cushion expands.

14. The airbag cushion of claim 1, wherein the vehicle body part comprises a vehicle dashboard.

15. An airbag cushion for a vehicle, the airbag cushion comprising:
   a first panel divided into an upper portion having first and second sides and a lower portion having first and second sides, the first and second sides of the upper portion and the first and second sides of the lower portion respectively being connected to each other and the lower portion being open to have a recessed portion: and
   a second panel having an upper end connected to the upper portion of the first panel and having a lower end connected to the lower portion of the first panel to form a chamber together with the first panel, the lower end being inserted in and connected to the recessed portion of the lower portion of the first panel such that the upper end cushions a passenger and the lower end is supported by a vehicle body part when the airbag cushion expands.

16. The airbag cushion of claim 15, wherein the upper portion of the first panel is formed such that a width thereof gradually increases upward from a joint with the lower portion of the first panel, and wherein the lower portion of the first panel is formed such that a width thereof gradually increases downward from a joint with the upper portion of the first panel.

17. The airbag cushion of claim 15, wherein an open groove having an increasing diameter is formed at an end of the recessed portion of the lower portion of the first panel.

18. The airbag cushion of claim 17, wherein a position of the open groove is determined such that a curved portion is supported by the vehicle body part when the airbag cushion expands.

19. The airbag cushion of claim 17, wherein an inner end forming the recessed portion of the lower portion of the first panel is smoothly recessed, such that a curved portion thereof protrudes.

20. The airbag cushion of claim 15, wherein the recessed portion is formed upward from an end of the lower portion of the first panel, and supporting portions protrude inside the recessed portion.

* * * * *